FIG.2.

Feb. 18, 1958  M. C. LEVERETT  2,824,056
REACTOR UNLOADING
Filed Oct. 11, 1945  9 Sheets-Sheet 4

Witnesses:
Herbert E. Metcalf
Estill E. Ezell

Inventor:
Miles C. Leverett
By:
Robert A. [signature]
Attorney.

Feb. 18, 1958 M. C. LEVERETT 2,824,056
REACTOR UNLOADING
Filed Oct. 11, 1945 9 Sheets-Sheet 5

Inventor:
Miles C. Leverett
By:
Robert A. [Attorney]

Feb. 18, 1958 M. C. LEVERETT 2,824,056
REACTOR UNLOADING
Filed Oct. 11, 1945 9 Sheets-Sheet 6

Inventor:
Miles C. Leverett
By:
Robert A. [Attorney]

Feb. 18, 1958 — M. C. LEVERETT — 2,824,056
REACTOR UNLOADING
Filed Oct. 11, 1945 — 9 Sheets-Sheet 7

FIG. 14.

_United States Patent Office_ 2,824,056
Patented Feb. 18, 1958

2,824,056
REACTOR UNLOADING

Miles C. Leverett, Oak Ridge, Tenn., assignor to the United States of America as represented by the United States Atomic Energy Commission Application October 11, 1945, Serial No. 621,687

1 Claim. (Cl. 204—193.2)

The present invention relates generally to neutronic reactors, and more particularly to a method and apparatus for unloading the fissionable material from a neutronic reactor.

In neutronic reactors, a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general, such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in the co-pending application of Enrico Fermi and Leo Szilard, now Patent No. 2,708,656, allowed May 17, 1955.

Broadly, the present invention contemplates the provision of a novel method of and apparatus for unloading selectively all or a part of the fissionable material from a neutronic reactor. Such unloading may be desirable, for example, to stop the reaction in the reactor in case the neutron density rises too high, or to remove fissionable material after a period of neutron bombardment for processing for recovery of $94^{239}$ and other products of the reaction, or to shut down the reaction for repairs on the reactor, and the like. Suitable mechanism is provided for normally restraining the fissionable material within the reactor which may be actuated automatically or manually to release fissionable material to permit it to drop by gravity into receiving means disposed beneath the reactor. The "hot" fissionable material is thus removed without contact handling by operating personnel. Also, rapid positive destruction of the reactor geometry obtains.

Hence, an object of the present invention is to provide a novel method of and an apparatus for unloading the fissionable material from a neutronic reactor.

Another object is to provide a novel neutronic reactor from which selected fissionable material may be quickly dropped into a receiving means.

Another object is to provide a novel method of and apparatus for quickly destroying the geometry of the reactive mass of a neutronic reactor without danger to operating personnel.

The foregoing and other objects and advantages are apparent from the following detailed description read with reference to the accompanying drawings, in which.

Figure 1:
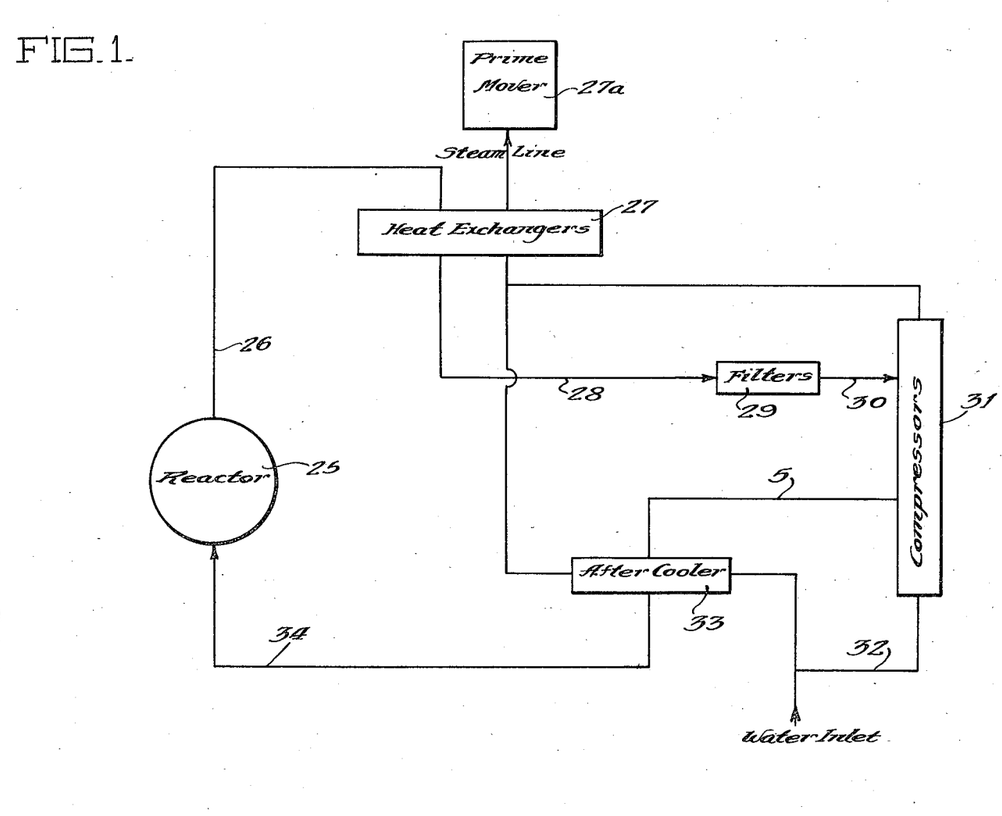
Fig. 1 is a flow diagram showing the relationship of a neutronic reactor and a cooling system therefor.

Referring to Fig. 1, a neutron chain reaction is effected in a reactor 25 diagrammatically shown. The heat generated by virtue of the chain reaction is carried away by helium passing from the reactor through a pipe 26 into heat exchangers 27, which may be of any well known type to provide steam for the prime mover 27a. This steam may be used in any conventional manner to generate power as desired. The cooled helium then passes through pipe 28 into filters 29, which remove any solid matter from the helium, and thence into a battery of water cooled compressors 31 through a pipe 30. The compressors may be of the centrifugal or reciprocating type although the former is generally preferable. For most efficient heat removal, the helium in the reactor is maintained under pressure, and for that reason the compressors 31 serve to establish and maintain the pressure and also serve as pumps to circulate the helium. The high pressure gas leaves the compressors 31 through suitable piping 32, and the heat resulting from the compression is removed from the gas in after-coolers 33. From these coolers, the helium gas is returned to the reactor through pipng 34. After-coolers 33 may be used to preheat water to be turned into steam in exchangers 27. Similarly, the jackets of the compressors 31 can be used to preheat the feed water for exchangers 27. During operation the heat exchangers may become more or less radioactive due to the radioactivity of the helium entering the exchangers. As a consequence cleaning of the exchangers may become difficult. In order to minimize the necessity for cleaning it is found desirable to use water treated for reduction of its scale forming and corrosive properties in the heat exchangers.

The pressure of the helium gas entering the reactor 25 is 115 pounds per square inch and the temperature is 120 degrees Fahrenheit. About 400,000 pounds of gas are circulated through the reactor shown herein per hour. The gas leaves the reactor at a pressure of 103.6 pounds per square inch and at a temperature of 800 degrees Fahrenheit.

Figure 2:
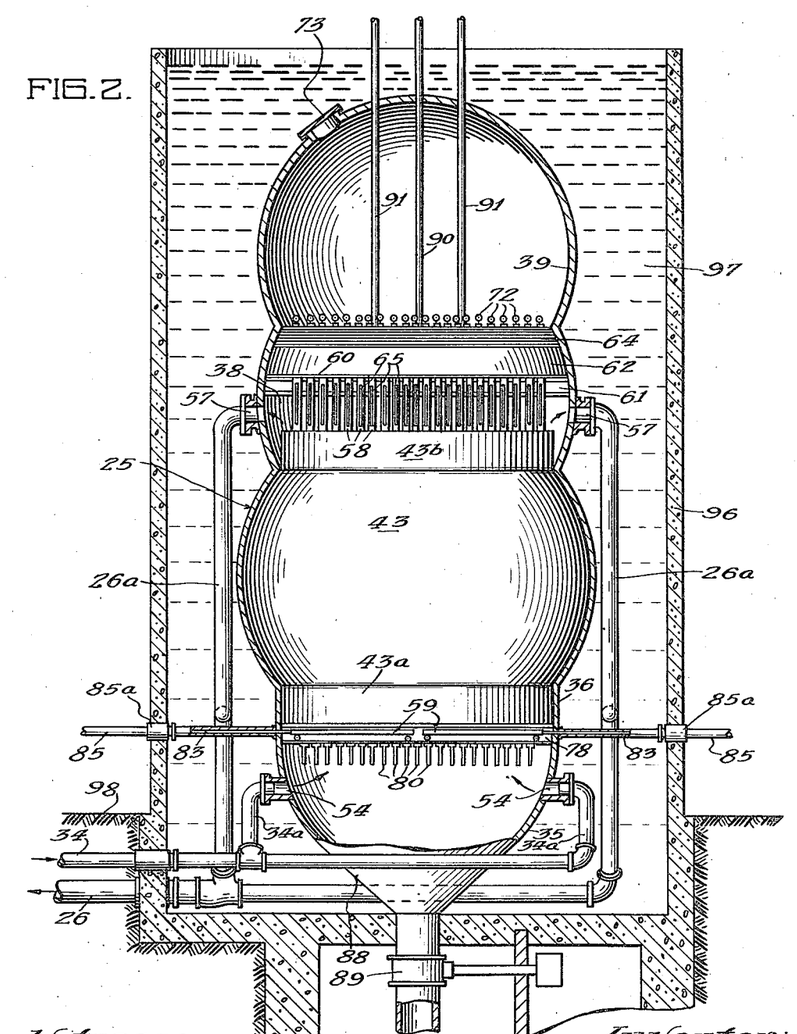
Fig. 2 is a vertical sectional view, partly in elevation, through a neutronic reactor constructed in accordance with the teachings of the present invention, the graphite and uranium lattice being shown in elevation.

Referring to Fig. 2, the reactor 25 consists of a lower chamber 35, which serves as a gas inlet and uranium discharge chamber. Above the chamber 35 is a valve housing 36 which accommodates the uranium discharge valves presently to be described. The uranium-graphite lattice pile is contained in chamber 37, above which is a hot gas discharge chamber 38. A dome 39 completes the shell making up the reactor 25. These shell segments are welded together so as to form one integral shell, and, as noted, the various segments are of spherical shape so as to give added strength to withstand the relatively high pressures existing in the shell.

Figure 3:
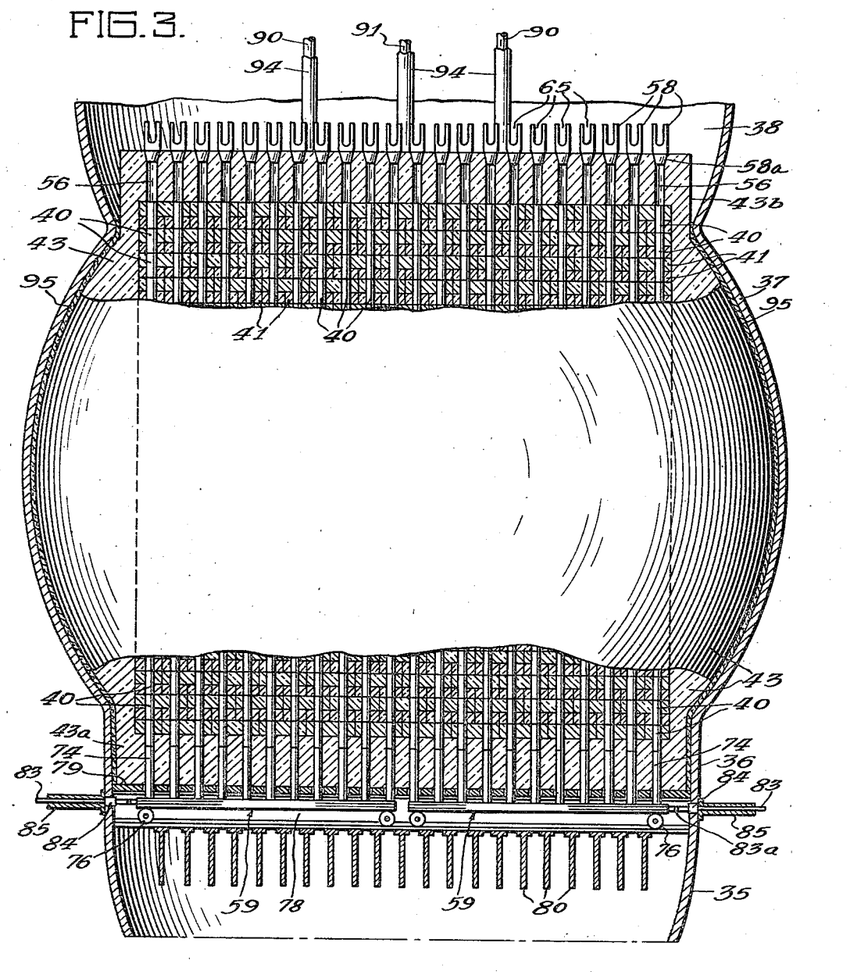
Fig. 3 is an enlarged fragmentary vertical sectional view, partly in elevation, through the center portion of the reactor shown in Fig. 2, indicating the relationship between the uranium and graphite and further illustrating the structure at the bottom and top of the lattice.

Referring to Fig. 3, the lattice structure comprises graphite cartridges 40 surrounded by graphite bricks 41. The cartridges contain uranium in the form of cylindrical aggregates or bodies 42 (see Figs. 10–13, inclusive.) A high-grade graphite is preferably employed for the cartridges and the matrix of the lattice structure. Surrounding the lattice is dead graphite 43 (Fig. 3), which need not be as pure graphite as that employed in the lattice.

Figure 4:
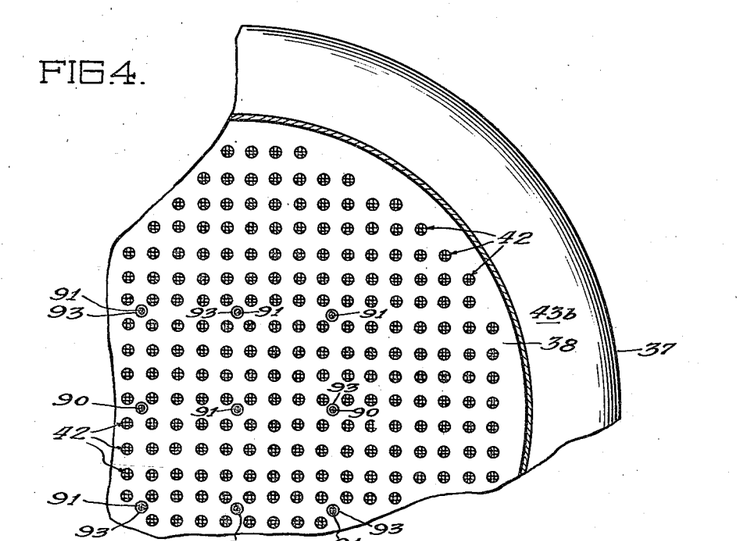
Fig. 4 is an enlarged fragmentary horizontal sectional view taken through the uranium and graphite lattice showing slightly more than one quadrant only of the reactor.

The graphite cartridges 40 are arranged in vertically disposed columns extending from the bottom of the lattice to the top. The columns are disposed in parallel rows, as indicated in Fig. 4, so that the uranium in the graphite is arranged in a cubical lattice.

Figure 5:
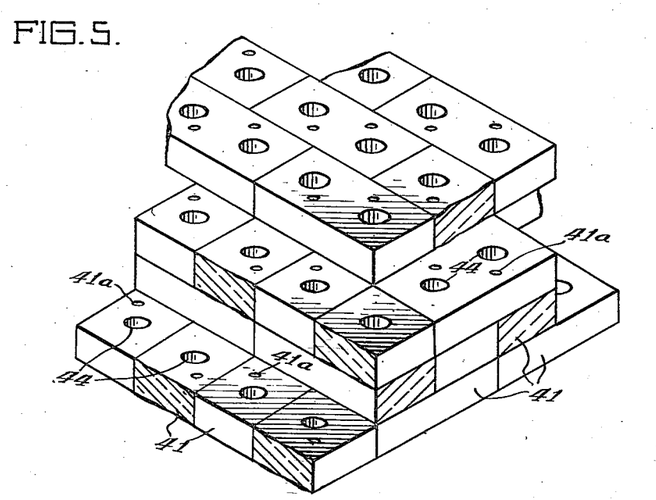
Fig. 5 is a perspective view illustrating one arrangement for the graphite making up the lattice structure.
Figure 6:
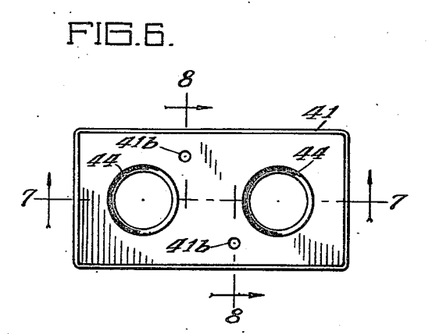
Fig. 6 is a plan view of a graphite brick shown in Fig. 5.
Figure 7:
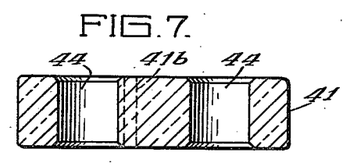
Fig. 7 is a longitudinal vertical sectional view taken on the line 7—7 of Fig. 6.
Figure 8:
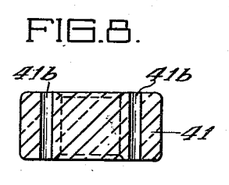
Fig. 8 is a transverse vertical sectional view taken on the line 8—8 of Fig. 6.
Figure 9:
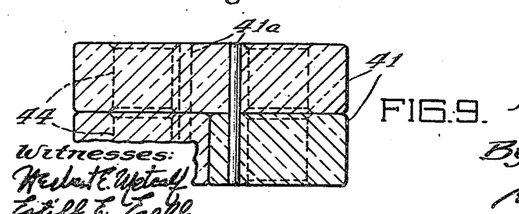
Fig. 9 is a vertical sectional view through three bricks illustrating the manner in which bricks are doweled together.

The graphite 41 may be in the form of bricks piled on top of each other, as shown in Fig. 5, doweled together by means of dowel rods 41a passing through holes 41b. As illustrated, the bricks are 22 inches long and have a cross section 11 inches by 5½ inches. Each brick finished but before drilling weighs 65.8 pounds. Each brick is drilled to provide holes 44 through which the graphite cartridges 40 will pass. As the lattice structure is being built, the graphite bricks 41 are piled up so that the holes 44 are in alignment to form a continuous vertical passage from the bottom to the top of the pile to accommodate each of the columns of graphite cartridges. Sufficient space is provided between adjacent bricks and between the cartridges and the bricks to permit expansion of the graphite.

Each of the graphite cartridges 40 (see Fig. 10) is provided with a longitudinal passage 45 extending throughout the entire height of the cartridge. Adjacent to the upper end of each cartridge is a cylindrical seat portion indicated at 47 provided with an annular shoulder 48 on which the uranium body 42 rests. Inasmuch as there is approximately only 50 percent free volume through the uranium bodies 42, the velocity of helium gas passing through the uranium is considerably greater than the velocity of the gas passing through the free passage in the graphite cartridges.

Most of the heat generated as a result of the neutron chain reaction is produced in the center portion of the lattice structure and progressively less heat is generated toward the outside of the structure. Because of this, it is desirable that a greater amount of helium gas pass through the central portion of the lattice structure than through the outside portions. A satisfactory way for controlling the flow of the helium gas through the passages in the graphite cartridges is to provide a throat or constriction 46 (see Fig. 10) in the outer cartridges to create greater resistance to the flow of the gas through these restricted passages. In this manner, by providing the narrowest throat or constrictions 46 in the outermost cartridges and further by gradually increasing the diameter of this constriction in the passages toward the center of the lattice structure and finally providing no constriction in the center portion of the construction, it is possible to selectively control the amount of gas flow through the various locations in the lattice to most effectively remove heat from the system.

The average mass velocity of the helium passing through the ducts in the lattice is about 5.56 pounds per second per square foot, while the maximum is at the center of the lattice and is approximately 12.8 pounds per second per square foot. The average linear velocity of the gas in the duct is about 110 feet per second and the maximum at the center of the lattice is about 254 feet per second. The average mass velocity of the helium gas in the uranium elements 42 is 8.83 pounds per second per square foot, while the maximum is about 20.4 pounds per second per square foot. The average linear velocity of the gas in the elements is about 175 feet per second, while the maximum is 404 feet per second. On an average, about 1068 pounds of helium gas per hour pass through each column, the centermost columns conveying the most, the maximum for one column being approximately 2460 pounds per hour. The heat transfer coefficient for the average column is about 163 B. t. u.'s per hour per square foot per degree Fahrenheit, while the coefficient for the centermost columns is about 318 B. t. u.'s per hour per square foot per degree Fahrenheit. 400,000 pounds of helium are circulated per hour, removing the heat equivalent of 100,000 kilowatts from the reactor. The power required for circulating the helium and running the auxiliaries of the plant is about 12,000 kilowatts, leaving a net power of around 88,000 kilowatts available to form steam for external use.

The uranium bodies 42 are each made up of a plurality of parallel plates 49 disposed vertically and spaced apart with lugs 50 serving as spacers between the adjacent plates. In this manner, a plurality of vertical passages 51 and 52 are provided between the plates. The uranium disposed in plate form as illustrated is thus provided with a relatively large amount of surface for cooling. The size of each uranium cylinder is about 3⅝ inches by 3⅝ inches, having approximately 50 percent free volume, and each weighs about 13.4 pounds. This weight represents the value for uranium metal cylinders. If uranium carbide is used, the weight of each cylinder is about 14.9 pounds. The overall mass ratio of graphite to uranium in the lattice is 5.4. The overall lattice structure is in the form of a cylinder 28 feet in diameter and 26 feet high and has a two foot layer of dead graphite at the top and a layer on the sides varying in thickness from 1 foot to 4 feet. These figures represent an operative lattice, but, of course, the invention is not intended to be limited to this specific example.

As shown in Fig. 3, a space is left between the dead graphite layer 43 and the shell of the reactor and this space is filled with shredded asbestos indicated at 95 to a thickness of about one inch. The graphite will expand and contract as a result of the heat generated in the lattice and for this reason the space must be provided. The asbestos layer will compress to permit this expansion but will serve to prevent leakage of helium gas through this space so that the gas cannot by-pass the lattice.

The inside surfaces of the reactor shell may be coated with some suitable material to prevent corrosion of the metal.

Figures 10, 11, 12, 13:
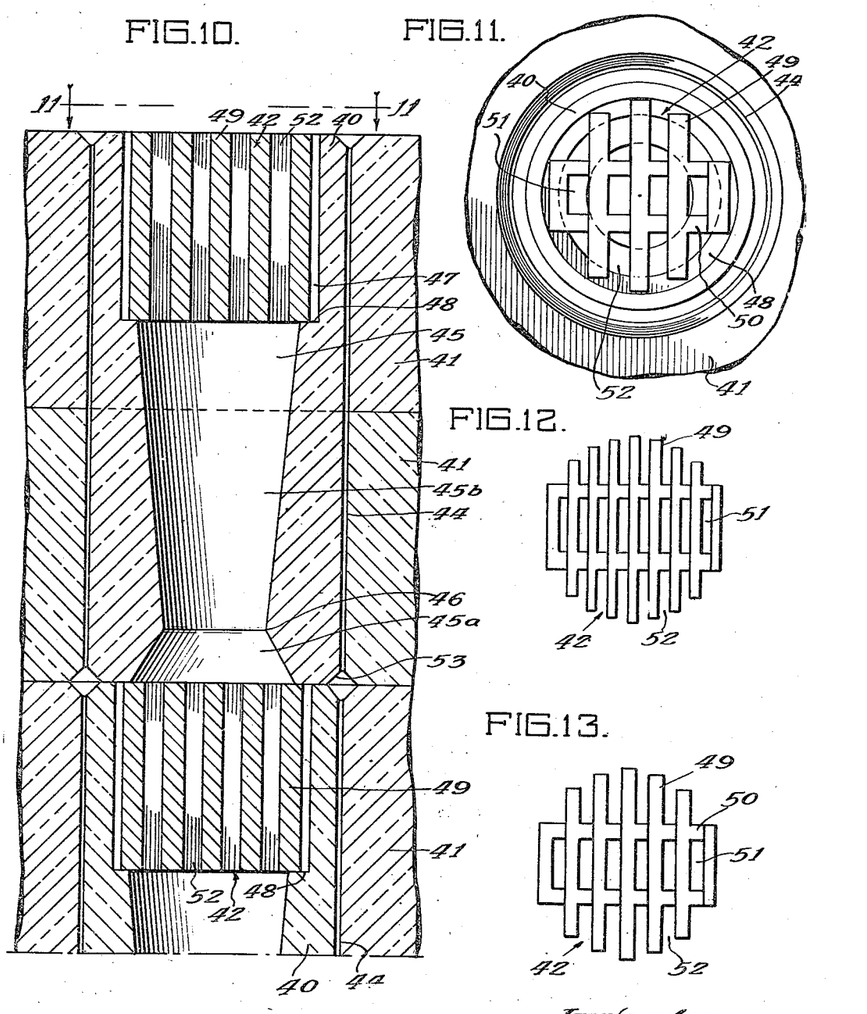
Fig. 10 is an enlarged sectional view through one of the graphite uranium cartridges which is inserted in the large holes in the bricks illustrated in Fig. 5.
Fig. 11 is a top plan view taken on the line 11—11 of Fig. 10.
Fig. 12 is a top plan view of an assembly of uranium plates which fits into the cartridge shown in Fig. 10 and is used at the center of the lattice structure where the heat is most intense.
Fig. 13 is an assembly of uranium plates corresponding to Fig. 12 but which is employed somewhat away from the center of the lattice structure where the heat generated is less intense.

As pointed out above, most of the heat generated by the chain reaction is generated in the uranium and is produced toward the center of the lattice, and consequently in this region a greater amount of surface exposed to the circulating medium should be provided on or adjacent to the uranium and particularly in the central area of the reactor than elsewhere than in the region in the structure. This is effected, as illustrated in Fig. 12, passing the coolant in direct contact with the uranium bodies and by decreasing the thickness of the uranium plates 49, thereby providing a larger number of plates with a greater number of passages between them. An intermediate condition will exist in the lattice structure in positions between the center and the top or the bottom. Thus, for these intermediate positions, uranium plates illustrated in Fig. 13 are employed wherein the thickness of the metal is greater than that illustrated in Fig. 12 but not as great as that shown in Fig. 11, so that the amount of cooling surface provided is somewhere between that shown in Figs. 11 and 12.

With the uranium 42 arranged in the form of vertically disposed plates 49 in the upper portion of the vertical passage 45 it is seen that a continuous passage through the graphite and the uranium is provided throughout the entire length of each of the cartridges 40. As shown in Fig. 10, each of the cartridges is chamfered, as indicated at 53, so as to facilitate the insertion of the cartridges into the openings 44 in the bricks.

The lattice structure filled to capacity usually contains about 12,000 uranium elements.

Referring again to Fig. 2, the helium gas enters the reactor from the pipe 34 (Fig. 1) through intake nozzles 54, passes upwardly in the direction of the arrows through vertical passages in the lower layer 43a of the dead graphite (Fig. 3), and then continues upwardly through the passages 45 in the graphite cartridges 40 (Figs. 3 and 10) throughout the entire height of the lattice, and finally through passages 56 in the upper layer 43b of the dead graphite into discharge chamber 38. The hot gas leaves the reactor from the discharge chamber 38 through discharge nozzles 57. From the reactor, as previously explained, the helium gas passes through the cooling circuit shown in Fig. 1.

At the top of the graphite 43 over each column of graphite cartridges 40 is a guide pipe 58 (Figs. 2, 3, and 14) socketed at its lower end in the graphite at 58a.

The top of the gas discharge chamber 38 is bounded by a steel floor 60 (Fig. 14) supported on a plurality of I-beams 61, which, in turn, are carried by the steel shell. Above the floor 60 is an internal neutron and gamma ray shield, generally indicated at 62, consisting of a 3 foot layer of graphite 63 and a layer of steel plates 64. The lowermost steel plate 64a is one inch thick, and the next plate 64b is a one inch steel plate with about 2 percent to 10 percent boron in the metal. The next 14 plates are of mild steel or cast iron, and each plate is about one inch thick.

Figure 14:
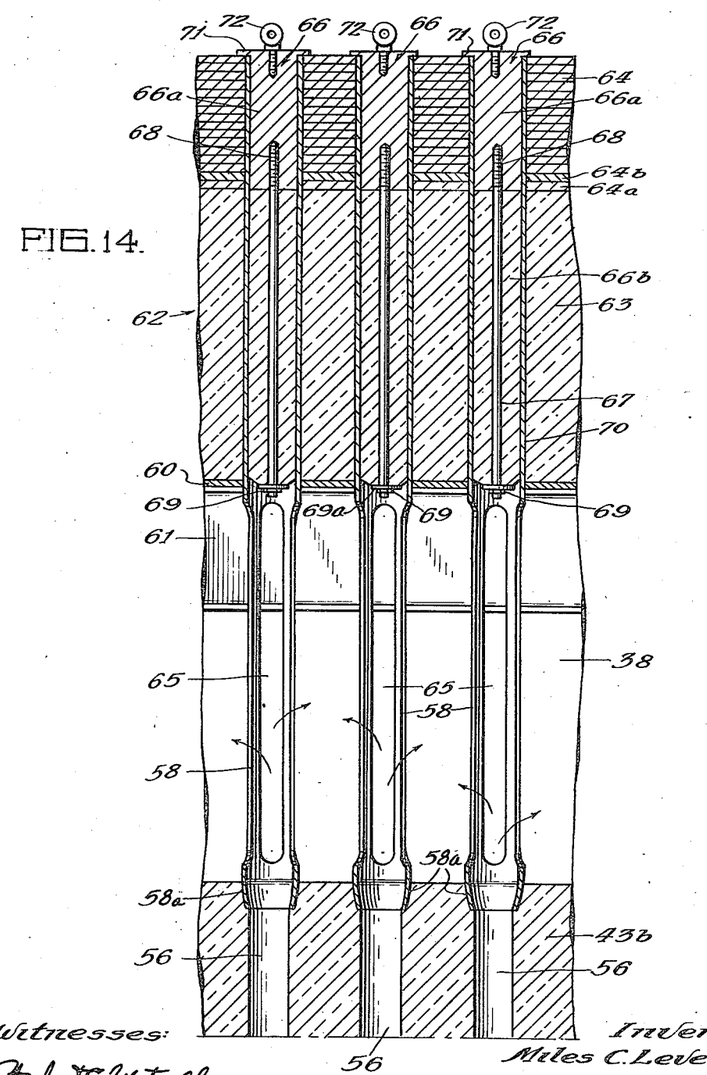
Fig. 14 is an enlarged detailed vertical sectional view, partly in elevation, through a portion of the reactor showing the relationship between the lattice structure, the internal shield for the reactor, and the guide tubes which extend from the graphite through the internal shield providing a passage for charging the uranium into the lattice.

The guide tubes 58 extend upwardly through the hot gas chamber 38 and through the graphite layer 63 and steel layer 64 making up the internal shield 62, and terminate at the top of the steel layer 64. Slots 65 are provided in the guide tubes 58 throughout substantially the height of the hot gas chamber 38 through which helium gas passing up through the lattice is discharged. At the top of the guide tubes 58 is a steel and graphite plug 66 consisting of a steel layer 66a corresponding in thickness to the thickness of the steel layer 64 of the internal shield and a graphite layer 66b corresponding in thickness to the graphite layer 63 of the internal shield. A threaded rod 67 passes through the longitudinal center of the graphite portion 66b of the plug and is threaded into the steel portion 66a, as indicated at 68. A suitable nut 69 is threaded onto the lower end of the rod 67 and a washer 69a is disposed between the nut 69 and the graphite 66b engaging the lower face of the graphite portion 66b of the plug. When the rod is drawn up tight into the steel portion 66a of the plug, the assembly becomes rigid. The plug is provided with a flange 71 which rests on the upper surface of the internal radiation shield 62, and a screw eye 72 is threaded into the top of the plug, providing means for grasping the plug for withdrawal and insertion into the shield.

The dome 39 encloses a chamber above the steel and graphite plug 62. A covered manhole opening 73 is provided in the dome 39 for admitting persons in and out of this chamber for loading uranium into the lattice. As previously explained, the uranium is mounted in the graphite cartridges 40 (Fig. 10) and the loaded cartridges are lowered by any suitable means (not illustrated) through the guide tubes 58 into the vertical passages 56 in the upper layer 43b of the dead graphite, and finally down into the lattice structure. In order to prevent establishment of a substantial concentration of radioactive material in the dome it is found desirable to establish a helium pressure within the chamber somewhat higher than that in adjoining chambers thereby preventing or at least minimizing diffusion of radioactive gases into the dome.

At the bottom of the lattice, each of the columns of graphite cartridges 40 is supported on a dead graphite cylinder 74 (see Fig. 3) through which is a vertical passage for conveying the helium gas into the passages 45 through the graphite cartridges 40. The graphite cylinders, in turn, are supported on dump valves generally indicated in Fig. 2 at 59. There is a plurality of such valves for discharging the uranium from the lattice.

During the operation of the present device, the transuranic element 94 is produced, together with radio-active fission products. After long periods of operation, the fission products may so poison the materials in the device by neutron absorption as to lower the reproduction ratio of the system. In order to perpetuate the chain reaction, it is essential that the value of the reproduction ratio remain above unity. Thus it may be desirable to remove the fission products from the lattice from time to time. This is done by removing the uranium from the lattice and replacing it with fresh material. The radio-active fission products and element 94 can then be separated from the uranium by extraction methods. The radioactive fission products are useful in medicine and as radiation sources, and element 94, being fissionable in a manner similar to $U^{235}$, may be used to enrich natural uranium to increase its efficiency in chain reacting systems, for example. The separation processes form no part of the present invention, so that no purpose will be served in describing herein the details thereof.

Dump valves 59 are especially useful in case of extreme emergency to prevent the reactor from being destroyed in case of failure of the control and safety rods to effectively limit the chain reaction to safe values. All or part of the uranium bodies can be dumped rapidly into chamber 35, destroying the geometrical arrangement of the uranium bodies in the graphite and thus preventing the maintenance of the chain reaction. Such procedure is only resorted to after failure of the control and safety rods to act. The dumping may be manual and/or automatic upon rise of the neutron density in the system to a dangerous level, as will be brought out later.

Figure 18:
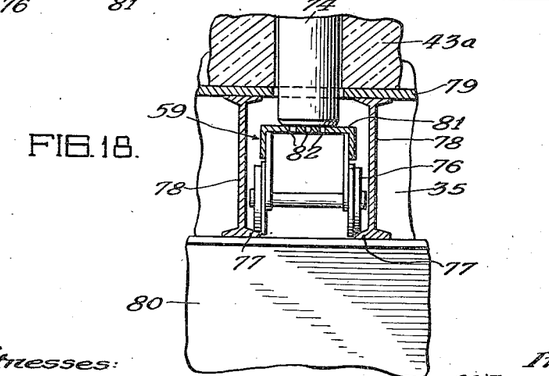
Fig. 18 is a vertical sectional view through one of the valves and showing the relationship of the valve to the lattice and the lattice support.

Each dump valve 59 in effect is a flat car mounted on wheels 76, operating on the bases 77 of adjoining I-beams 78, the bases serving as rails. The I-beams 78 are spaced apart, as best shown in Fig. 18, and on their upper flanges support a floor 79 on which is mounted the dead graphite 43a (see Fig. 3). The I-beams 78, in turn, are supported on T-beams 80, which are carried by the reactor shell.

Figure 16:
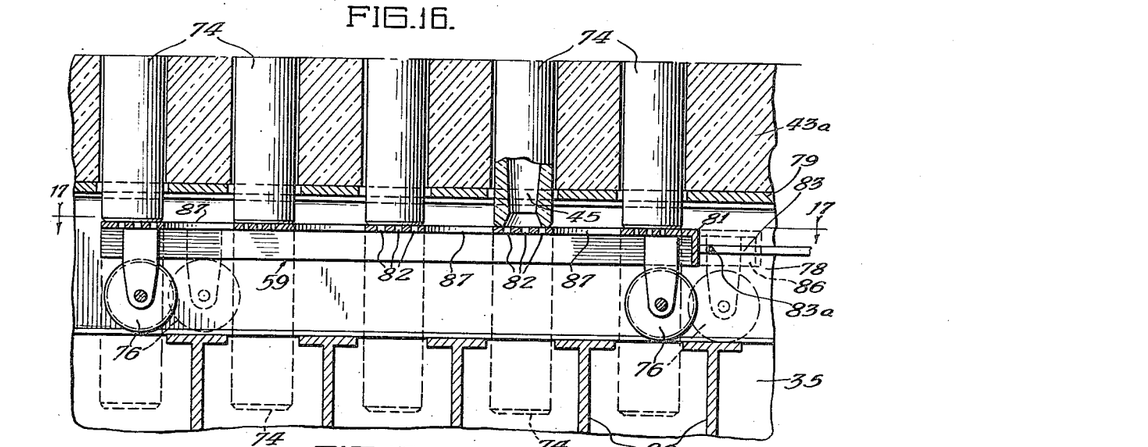
Fig. 16 is an enlarged vertical sectional view, partly in elevation, through one of the discharge valves showing the relationship of the valve to the lattice structure.
Figure 17:
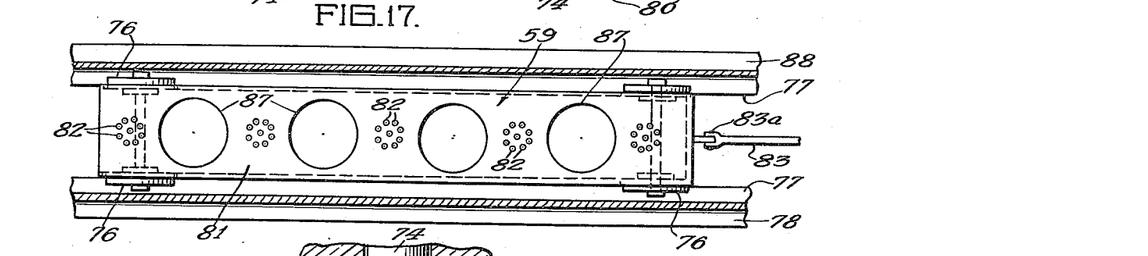
Fig. 17 is a horizontal sectional view taken on the line 17—17 of Fig. 16.

Referring to Figs. 16–18, inclusive, each dead graphite cylinder 74 supporting a column of uranium cartridges 40 rests on the top 81 of the dump valves or cars 59 directly over a plurality of perforations 82 through the top 81 of the cars 59, the perforations 82 being in alignment with the vertical passages through the dead graphite cylinders 74 and the passages 45 through the column of graphite cartridges 40. Thus, with the dump valve or car 59 disposed in the solid line position shown in Fig. 16, helium gas passes upwardly from the inlet chamber 35 between the T-beams 80 and I-beams 78 through the perforations 82 in the top 81 of the valve cars, and then through the vertical passages leading through the lattice structure.

Figure 15:
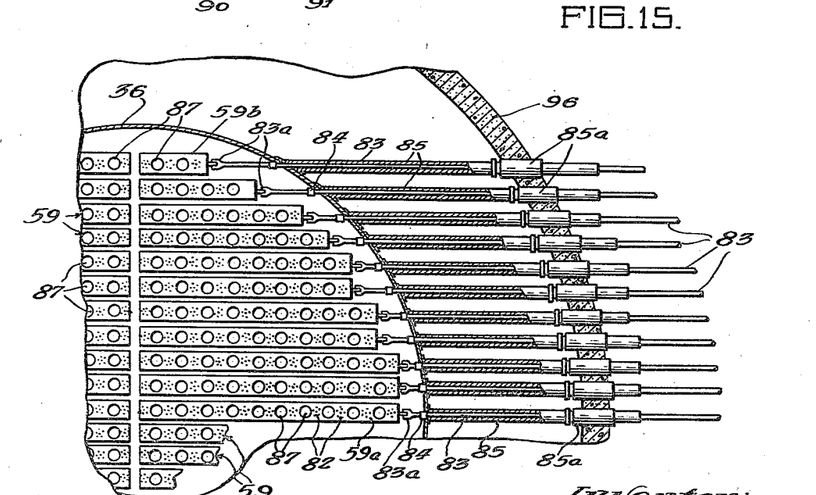
Fig. 15 is a fragmentary horizontal sectional view, partly in plan, taken through the lower part of the reactor showing the arrangement of the valves used in discharging the uranium from the lattice structure.

The dump valves or cars 59 vary in length, depending upon their position in the lattice, as shown in Fig. 15, the centermost car 59a being adapted to support 10 columns of cartridges, whereas the outermost car, shown at 59b, supports only two columns.

As illustrated in Fig. 15, the cross section of the reactor, insofar as the dump valves are concerned, is divided into four quadrants, each quadrant being provided with 11 dump valves or cars and being served entirely independently of the other quadrants of the reactor. One quadrant only is completely shown in Fig. 15, though each of the other three quadrants is an exact duplicate of the one illustrated, except that in the left hand half of the reactor shown in Fig. 15, the dump valves or cars operate in the opposite direction from that shown for the right hand half of the reactor.

Extending horizontally from the front of each of the dump valves or cars 59 is a dump rod 83 suitably fastened to the car as shown at 83a in Figs. 16 and 17. The dump rods 83 project through the shell of the reactor, as shown in Fig. 15, and extend horizontally to a valve control position (not shown) outside the reactor shell. Stuffing boxes, generally indicated at 84 in Fig. 15, are provided around each of the dump rods 83 where the rod passes through the shell of the reactor to prevent escape of gases from inside the reactor shell. The dump rods 83 are slidable in guide tubes 85. Stuffing boxes 85a surround the guide tubes 85 where they pass through the concrete wall 96. The guide tubes may be provided with suitable means (not shown) for absorbing or obstructing the path of neutron and gamma radiation therethrough as will be understood by those skilled in the art.

When dumping or discharging the uranium from the lattice structure for purposes of treating the uranium, all of the columns of uranium loaded graphite cartridges 40 supported on a single dump valve car are dumped or discharged simultaneously. In other words, referring to Fig. 15, all 10 columns of uranium loaded graphite cartridges supported on the dump valve car 59a are discharged simultaneously. This is done by moving the car to the dotted line position 86 (see Fig. 16) wherein large circular openings 87, shown in Figs. 16 and 17, become disposed directly under the dead graphite cylinders 74, thereby permitting the dead graphite cylinders 74 and the column of uranium loaded graphite cartridges 40 supported thereon to discharge through the openings 87 in the dump valve car. The graphite and uranium thus discharged passes down into a downwardly extending chute 88 shown in Fig. 2, and accumulates at a gate valve 89. Upon opening of this gate valve 89, the uranium and graphite thus discharged can be passed into a suitable car or container.

A self-maintaining chain reaction, once started, must be controlled, for otherwise the neutron density may increase so rapidly that the reaction will reach violent proportions. The rate of heat generation in the lattice may exceed the rate of heat removal by the heat extraction system so that the temperature in the reactor will rise beyond a safe limit, even to the point of causing the uranium to melt with resulting break-down of the lattice structure.

Referring to Figs. 2, 3 and 4, four control rods 90 and five safety rods 91 pass vertically into the lattice through vertical openings 93 in the graphite 41 between the cylinders of uranium 42. These rods extend about two-thirds of the vertical distance through the lattice and serve to absorb neutrons so as to stabilize or stop the chain reaction.

The safety rods 91 are movable vertically in the lattice but are to be disposed either in their lowermost position in the lattice or in their outermost position, the latter position being assumed when the chain reaction is in effect. The safety rods are lowered into the lattice only in the event of emergency or when the operation of the reactor is to be entirely stopped for any reason.

The control rods 90 also are movable vertically in the lattice but their positions will vary, their function being to stabilize the chain reaction and, with the help of the helium gas, to maintain a constant temperature in the lattice of about 800° F. as the maximum.

All of the rods 90 and 91 may be controlled automatically, as will be explained later, or manually. Though nine rods in all are shown more or less rods may be used if desired.

The absorption of the neutrons by the control rods 90 is accompanied by considerable heat. Cooling water may be circulated through or about the control rod 90 if desired.

Extending above the lattice and surrounding each of the rods 90 and 91 is a guide pipe 94 (Fig. 3) to guide the movement of its corresponding rod. These pipes also may be provided with suitable means (not shown) for preventing escape of radiations from the reactor.

Referring to Figs. 2 and 15, a concrete shield 96 completely surrounds the reactor and extends vertically throughout the entire height of the reactor, terminating approximately eight feet above the top of the reactor dome 39. The concrete shield is cylindrical in cross section and is spaced a minimum distance of ten feet from the nearest point on the reactor shell. This concrete shield 96 is filled with water, shown at 97 in Fig. 2.

Extending downwardly from the discharge nozzles 57 are discharge pipes 26a which are enclosed within the concrete shield 96 and are disposed as closely as possible to the reactor shell so that there is a substantial thickness of water between the discharge pipes 26a and the concrete wall 96. These discharge pipes extend down to the bottom of the concrete shield to a position below the level of the ground indicated at 98, and are connected to the main discharge header 26, which likewise is disposed below the ground level.

Similarly, the gas intake header 34 (Fig. 2) is disposed below the level of the ground and passes through the concrete wall 96 of the shield entering the reactor through branch headers 34a, which are completely submerged in the water shield.

The construction of the lattice is commenced with the excavation for the foundations for the reactor shell proper and for the concrete structure or shield containing the water in which the reactor is immersed. The reactor shell itself, with its underground connections, dump valves, and graphite supporting beams is then built up to the level of the upper or internal radiation shield 62, and any necessary elevators and temporary super-structure required is erected. The graphite bricks 41, which have previously been machined and bored, are then laid, doweling them together and taking particular care to keep the brick surfaces perfectly true and clean. When all the graphite bricks are laid, a temporary platform is laid over the top of the graphite bricks, the platform being provided with a hole directly over the location of each of the graphite cartridges. With a special reaming tool, each hole through the graphite is properly gauged throughout its length to detect the presence of any shoulders or projections, and such projections and shoulders are removed with the reaming tool. Following this operation, the temporary platform is removed and the beams 61 for supporting the upper or internal graphite shield 62 are placed into position. The upper shield 62 is then built up of graphite to its final thickness of about three feet. The beams for supporting the steel plates are then laid and the 16 one-inch plates making up the steel portion 64 of the shield are laid on top of the beams. The guide pipes 58 are then inserted in place and suitable thermocouples (not shown) for measurement of temperature within the reactor adjacent the point at which the cooling fluid is removed, installed on them. The steel and graphite plugs 66 are then inserted and the control and safety rod guides installed. The piping for the helium gas is then installed and fitted to the reactor shell and then the concrete shield 96 is poured. The mechanisms for operating the control and safety rods are finally installed in their proper place, and the entire unit is then in condition for operation except for the loading of the uranium.

From within the dome 39 of the reactor shell the graphite cartridges 40 loaded with the uranium plates 42 are lowered into the openings in the graphite. Several cartridges arranged in a column may be lowered into place at a time.

During the loading of the uranium, both the control rods and the safety rods 90 and 91 respectively are disposed in their innermost position in the lattice. As the charging of the uranium approaches the quantity necessary to produce an operating lattice, the loading operation will be suspended long enough for trial runs to be made. During the trial runs, the safety rods are moved to their outermost positions and the control rods are moved to various positions. Readings of the neutron density are made by the use of indium foils inserted in suitable testing slots in the lattice. The indium foil is inserted in the lattice and left there for a predetermined period of time, during which the foil is subjected to neutron bombardment. Then by suitable Geiger-Mueller counters, the beta radiations from the indium foil radio-activitiy created by the neutron bombardment are counted. When it is found by this experimental means that the quantity of uranium in the lattice will support a chain reaction at the highest temperatures contemplated, the loading of the uranium is discontinued. All empty portions of the columns are then filled with dead graphite so as to complete the lattice structure. The ratio of graphite to uranium and the size of the uranium plates may be determined in accordance with the principles discussed in copending application of E. Fermi and Leo Szilard Serial No. 568,904, filed December 19, 1944, now Patent No. 2,708,656.

The power plant above described is ideally adapted for automatic control to maintain the neutron density within the reactor substantially constant at a predetermined level, and thus give a substantially constant power output. Due to the fact that large masses of materials are utilized in the reacting portion of the structure, there is a temperature lag therein. Consequently, it is convenient to monitor and control the reaction by means of ionization chambers which will measure the neutron density at the periphery of the lattice portion of the structure. As the rate of neutron diffusion out of a chain reacting system is always proportional to the rate of generation of neutrons within the structure, the ionization chambers can readily be placed at the periphery of the pile or lattice, and in fact are preferably so positioned in order that they be not subjected to the extremely high neutron densities existing within the lattice.

Before proceeding to a description of one type of control system that may be utilized, it is desirable to point out the manner in which the control rods operate to regulate the neutron density. In any self-sustaining chain reacting structure adapted to produce power, the neutron multiplication ratio of the system must be greater than unity. For any value over unity, by an amount sufficient to overcome impurity losses in the system, the chain reaction becomes self-sustaining and the neutron density without control will increase exponentially in point of time, until the device is destroyed. For proper control, the system must be held in balance by maintaining the chain reaction at some point where the production of new neutrons is balanced with the neutrons initiating the chain. Under these conditions, the reacting portion of the structure will continue to maintain the neutron density therein which obtained when the system was balanced.

However, in order to enable the reactor to reach a desired neutron density, the system must be permitted, for a period of time, to rise in neutron density until the desired density is reached. After the desired density has been reached, it is necessary thereafter to hold the system in balance.

Inasmuch as the reproduction ratio of the lattice structure is reduced by the presence of neutron absorbing impurities, such impurities can be introduced in the lattice in the form of the control rod which can be of a material such as boron or cadmium, which will absorb large amounts of neutrons. The depth to which this control rod penetrates into the lattice will determine the reproduction ratio of the lattice and a range can be obtained between a condition providing a neutron reproduction ratio which is greater than unity and a condition at which no chain reaction can be maintained. The exponential rise of neutron density can be made relatively fast or relatively slow in accordance with whether the multiplication ratio is permitted to be much greater than one, or only slightly greater than one. There is a small percentage of delayed neutrons emitted in the fission process. These delayed neutrons cause the neutron density to rise in an appreciable time rather than almost instantaneously. The time for doubling the neutron density increases as the multiplication ratio approaches unity, and by adjustment of the control rods any desired rate of rise can be obtained up to the maximum corresponding to the reproduction ratio characteristic of the given structure when all control and safety rods are removed.

The broad method of control preferred is to withdraw all safety and control rods from the structure to a point where there is an exponential, and preferably slow, rise in neutron density within the structure. When a desired neutron density has been reached, the control rod is then returned into the pile to a point where the reaction is balanced. This balance is then maintained to maintain a constant power output in the reactor. The maintenance of the balance point with the control rod would be relatively simple were it not for the fact that changes in temperature change the reproduction ratio of the structure slightly, and in any chain reacting structure where there is any variation of pressure of the circulating medium for example, or in atmospheric pressure in case of a structure exposed to the atmosphere, the reproduction ratio of the system will slightly change. It is desirable, therefore, that the control rods be so manipulated that they maintain a constant neutron density within the system. Such a method of control may be accomplished by automatic connection of the control rods with an ionization chamber measuring neutron density, positioned within the reactor close to the lattice.

Furthermore, due to the exponential rise of neutron density within the reacting structure when the multiplication ratio is greater than unity, all possible precautions must be taken to prevent a continued exponential rise in neutron density in case of failure of the control rod to return to the balance position. It is for this reason that safety rods are provided. In case the neutron density has risen to a very large figure before the safety rods operate, it might then be impossible for the safety rods to absorb a sufficient number of neutrons to reduce a dangerously high neutron density to safe limits in a sufficiently short period of time. Under these circumstances, there is no alternative but to dump the uranium bodies and thus destroy the lattice arrangement by which the self-sustaining chain reaction is made possible.

While there are many means by which the control rods, the safety rods, and the dumping can be operated, it is believed that by the illustration and description of one simplified circuit, other and fully equivalent circuits will be made apparent to those skilled in the art.

Figure 19:
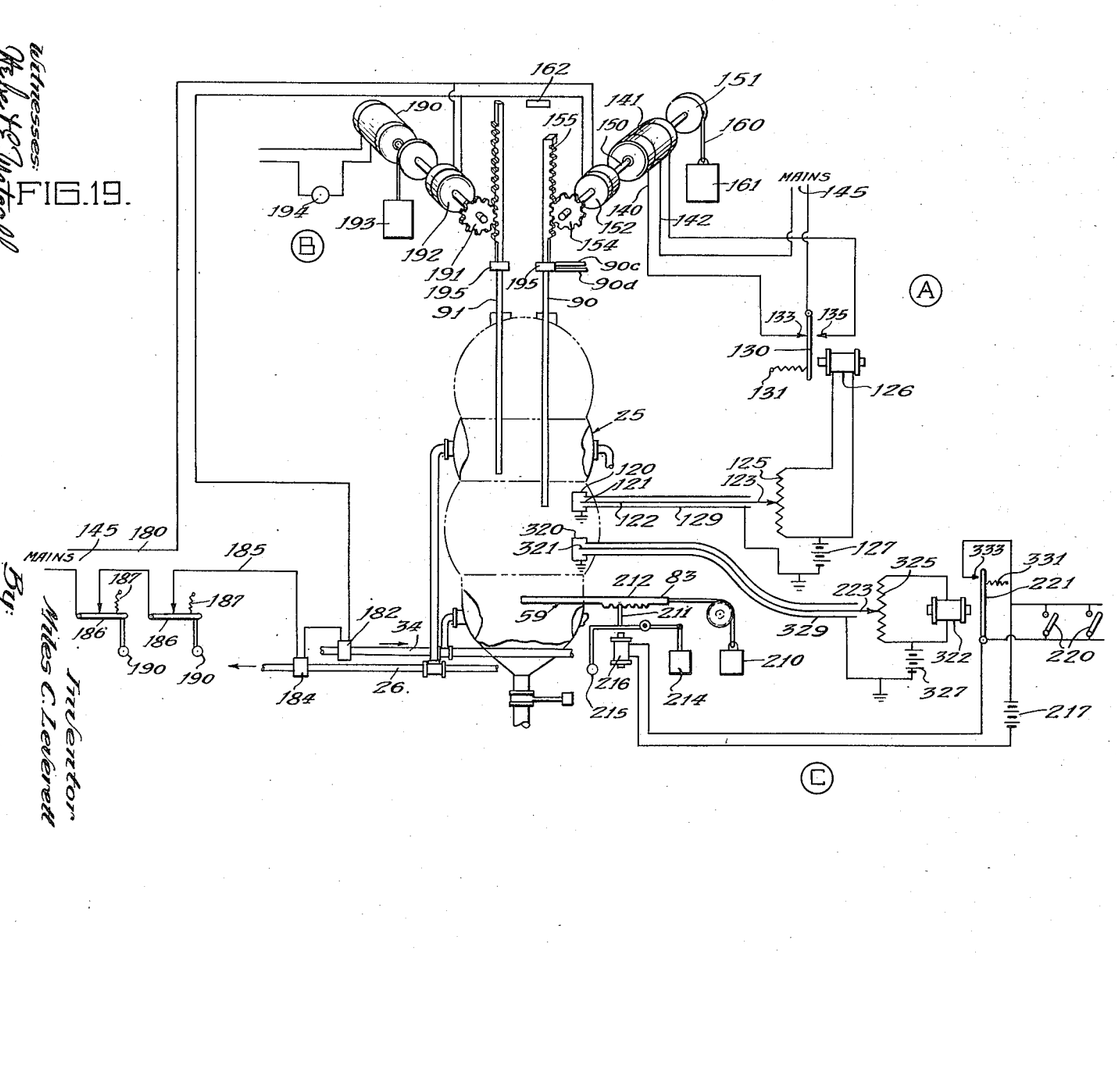
Fig. 19 is a diagrammatic view showing the control system for the power plant, the electrical circuits being reduced to the lowest terms.

Referring therefore to Fig. 19, which shows diagrammatically and reduced to lowest terms one form of control circuit that may be used for regulating the output of the power plant hereinbefore described, and referring first to control circuit A, a control ionization chamber 120 is placed within the reacting structure adjacent to the periphery of the lattice and filled with boron fluoride. A central electrode 121 is provided within the chamber 120 and connected to wire 122 leading outside of the reactor to a movable contact 123 on a resistor 125. Resistor 125 is connected across a relay coil 126. One side of relay coil 126 is connected to battery 127, the other end of which is connected to shield 129 around wire 122. Shield 129 is grounded, as is chamber 120. Alpha ray ionization due to neutron reaction with the boron within chamber 120 is proportional to the neutron density. Usual auxiliaries such as current amplifiers, supplemented relays etc. may be employed if desired in order to increase the sensitivity of the device. Thus the current in resistor 125 is varied in accordance with neutron density reaching the ionization chamber. Relay coil 126 operates a relay armature 130, which is spring biased by spring 131 to contact one motor contact 133, and is urged by current in coil 126 to contact a second motor contact 135. Contacts 133 and 135 connect to the outside of split winding 140 of motor 141, the center connection 142 of which is connected through power mains 145 to armature 130. Motor 141 operates shaft 150, having on one side thereof a pulley 151, the other end thereof being connected through a magnetic clutch 152 to a control rod gear 154. Control rod gear 154 meshes with a rack 155 on a control rod 90. Pulley 151 has a cable 160 wound thereon connected to a counter weight 161 so that the weight of the control rod is substantially balanced by counter weight 161, thus permitting motor 141 to run easily in either direction. As several control rods are to be utilized to control the pile, it is preferable that each rod be controlled by a separate ionization chamber and that the chambers be distributed around the periphery of the lattice.

Having described a circuit for controlling the position of a control rod, we shall now describe its operation, considering the safety rods withdrawn. Slider 123 on resistor 125, having previously been calibrated in terms of neutron density, is moved to the density position at which it is desired the reactor to operate, taking into account the difference in neutron density at the center of the lattice and at the periphery thereof during operation. This difference is a constant ratio at various operating densities. The reactor having at rest a neutron density much lower than the desired density at which relay coil 126 will receive enough current to operate armature 130, very little ionization takes place in ionization chamber 120, thus causing armature 130 to rest against contact 133. Motor 141 is thus energized to withdraw the control rod from the reactor to a point as determined by a limit stop 162, where the multiplication ratio of the reactor is just sufficiently greater than unity to permit an exponential rise in neutron density with the reactor. The motor 141 will stall at stop 162, and should be of a type permitting stalling for the required time. The reaction at this position of the control rod becomes self-sustaining and the neutron density rises. In consequence, the ionization within chamber 120 rises. As the ionization in chamber 20 increases, more and more current passes through relay coil 126 until the desired value has been reached. Relay coil 126 then operates to cause armature 130 to connect with contact 135, thus reversing the motor 141 to drive the control rod into the reactor to a point where the neutron density starts to decay. The control rod 90 will thereafter hunt between a point above the balance position where the neutron density rises and a point below the balance position where the neutron density decays, providing an average neutron density within the reactor as determined by the setting of slider 123 on resistor 125. As the mass of the reactor causes any temperature change to lag behind any neutron density change, the temperature of the reactor is maintained substantially constant. If desired, any of the well known anti-hunting circuits may be utilized, as will be apparent to those skilled in the art.

The main purpose of the control circuit A is to regulate the control rods to substantially balance the neutron density to produce any desired average temperature within the reactor.

Due to the fact that it might be possible for the control system as described to fail and thereby leave the control rods in a position where the neutron density would continue to rise indefinitely, both the safety rods 91 and the control rods 90 are preferably to be operated so as to enter the pile immediately upon any failure of the control rod system. One such emergency circuit for operating the rods is illustrated in circuit B. The circuit for each of the safety rods is the same.

The circuit B comprises a connection to main power line 145, one side of which leads through wire 180 to the magnetic clutch 152 on the control rod shaft draft. Wire 180, after passing through clutch 152, passes in series through a pressure switch 182 in the helium input pipe 34 and then in a series with a thermostat 184 in the helium output pipe 26. Return wire 185 from the thermostat 184 then passes through a series of emergency switches 186, each of which being held closed by springs 187, and opened by manual operating handles 190. Thus, magnetic clutch 152 on the control rod motor shaft is in series with the power mains, the helium output temperature thermostat 182, the helium input pressure switch 184, and the emergency switches 186. The opening of any one of the switches will thus de-energize clutch 152 to remove the urge of the counterweight from the control rods. The control rods will fall by gravity into the reactor. Furthermore, any failure of power in supply line 145 will also de-energize clutch 152 and permit the control rod to fall into the pile.

Each safety rod 91 may be raised out of the pile by safety rod motor 190 driving safety rod gear 191 through safety rod magnetic clutch 192, the safety rod being provided with a balancing counter weight 193 similar to that used on the control rod. Motor 190 is hand controlled by switch 194. Safety rod magnetic clutch 192 is connected in parallel with control rod magnetic clutch 152. Thus, upon any failure of power in the mains or the opening of any of the switches 182, 184, or 186, all of the rods will be relieved of their counted weights and will fall into the pile by gravity. Stops 195 may be provided on the safety rods, and any suitable braking action used to reduce the impact shock on the reactor.

However, in an abundance of caution, it is arranged that in case of failure of both the control and emergency circuits just described to stop the chain reaction, a portion of the lattice structure may be dumped by the use of circuit C. Dump valves 59 can be used for this purpose by connecting one or more of the dump valve rods 83 to a dump counter weight 210 urging the dump valve to open position. The dump valve is maintained closed by a dump valve latch 211 held in engagement with rack 212 on the dump valve rod 83 by latch counter weight 214. Latch 211 may be withdrawn manually by means of handle 215, or electrically by means of coil 216, which is energized by a battery 217, which preferably is separate and apart from power line 145. The circuit for coil 216 may be closed in two ways, either by hand switches 220, or by relay armature 221 moved by a relay coil 322 controlled by an emergency circuit identical in all respects with the ionization chamber control circuit previously described for actuation of the relay 126 in circuit A. The individual portions of this circuit will therefore be numbered with numbers plus 200 corresponding to those used in circuit A, previously described.

The emergency ionization circuit is set by means of slider 223 to respond to a neutron density approaching the danger limit of the structure. Thus, in case the neutron density approaches the danger limit, the relay operates and portions of the lattice are automatically dumped. In case of failure of the automatic circuit to dump, the hand switches can be utilized; and, in case of failure of the hand switches, the handle 215 may be operated to dump the system. Obviously, such dumping is resorted to only in extreme emergency.

To place the system in operation, it is first tested under 150 pounds air pressure and examined for leaks, using any suitable method. Each section of the structure that can be blocked off is separately evacuated, then filled with helium at 115 pounds pressure. This helium is then evacuated and the system filled with new helium with all radiation shields in place and with the control and safety rods completely inserted into the reactor. The circulation of water is started through the compressors, the aftercoolers, and the heat exchangers. The compressors are then started, to circulate the helium. The control rods are left in the reactor, and the safety rods withdrawn and held. The control circuit A is then set for a neutron density corresponding to about a 70° F. rise in temperature in the reactor by measurement and observation of the temperature during manipulation of the rods. After checking all parts of the system for proper operation, the temperature of the outlet gas is then stepped up at the rate of about 70° F. a day until the desired temperature of 800° F. is attained in the outlet gas. The control circuit A is then set to keep the neutron density sufficiently constant to maintain the desired gas output temperature and the safety circuits B and C set to operate to shut down the system in case of any substantial rise in neutron density or output gas temperature, failure of the circulating system or suspension of power supply from the mains. In accordance with good engineering practice, sufficient standby auxiliaries should be provided for substitution in the system in case of failure of individual units, such as, for example, a compressor. A standby generator may also, if desired, be provided for immediate switch-over in case of power main failure. Such standby equipment, however, does not obviate the necessity for adequate safety and emergency control.

In addition to the usual industrial hazards during operation of the power plant, operating personnel must be protected from injury by gamma rays and neutrons generated in the pile reactor and from radiation from the circulating gas and equipment, from beta rays, from close contact with radioactive materials, and from radioactive poisoning due to inhalation of radioactive gases.

The problem of radiation from the pile is met by building the concrete shield, of one foot minimum thickness, around the reactor shell, and filling the intervening space with water which covers the top of the shell to a depth of 8 feet. The minimum thickness of the water layer between the steel shell and the concrete shield is 10 feet. The gas discharge pipes pass downward through this water as near to the shell as practical, so that no extra shielding for them is required until they emerge from the concrete shield somewhat below ground level. These precautions will reduce radiation from the pile structure to 0.10 roentgen per 8 hr. day at the point of closest possible approach.

Walkways may be built around the concrete shield at the level of the dump valves, and at the level of the housings for the ionization chambers. A stairway and elevator may also be installed, with platforms at each outlet through the radiation shield. Roughly 2200 ft.$^3$/day of an explosive mixture of hydrogen and oxygen will be evolved from the water surrounding the shell. While this gas production is the basis for a "no-smoking" rule near the top of the system and for a requirement for sparkproof electrical equipment, natural ventilation makes other precautions unnecessary.

Many of the problems in connection with protection of personnel arise from the fact that the helium gas will carry some of the fission products with it, emitting both gamma rays and neutrons as it flows. The fraction of the fission products formed which escapes into the gas is, however, less than $2 \times 10^{-4}$. Local deposition of the fission products in, for example, the heat exchangers or the filters will intensify the radiation problem there, but will alleviate it in other locations, such as the compressors.

For protection against radiation from fission products which are in the circulating gas, all lines and equipment are either placed in concrete lined trenches and covered with a sufficient quantity of dirt to provide adequate protection, or housed in thick walled concrete structures. All valves are constructed with an extended bonnet and long stem as shown in Fig. 15, which permits the stuffing boxes to be carried through the radiation shield for tightening. Stuffing boxes on all large valves may be vented in order to permit the helium that leaks through the stuffing boxes to be collected and returned to the system. Motor driven valves are preferably located at key points in the circulating system so that parts of the system may be blocked off quickly in the event of a line break or serious leak in the system. The valve control system is arranged so that any valve may be operated either from a point near the valve itself or from a main instrument house remote from the system. On any piece of equipment which may be cut out of the system, double valves are installed, one motor driven and one hand operated.

The primary purpose of the gas cleaners or filters 29 (Fig. 1) is to remove some of the solid fission products from the circulating gas. A less important function is to remove graphite dust from the system. A filter which will remove fine smokes is effective in taking out at least a substantial portion of the solid fission products. A filter element of a special rock wool, of fiber size of the order of 2 to 3 microns, and containing about one pound per square foot of the rock wool, is utilized in the example described. Accordingly, the filters 29, shown in Fig. 1 in the circulating system, are preferably designed on the basis of smoke filters.

Each compressor may be housed in a concrete building with walls 4 feet thick, carrying a 3 foot thick roof made up of precast slabs which can be removed (not shown). A crane may be erected on the roof and may be used for erection of the units and for moving heavy parts for repair. Each compressor house may be individually ventilated with a fan, and each compressor may have its own instrument board. The compressor itself may become radioactive in time, but with ten operating compressors and two standbys, for example, it is evident that in a systematic rotation of compressors each machine will be available for examination and cleaning at least once in 30 days. Special precautions to detect compressor leakage may be taken, for example, by using recording chambers in the vent of each stall.

The inhalation hazard for personnel operating the structure can be considered on the basis that the maximum helium leakage which might occur from the system is 1 percent of the volume contained per day, and on the basis that the maximum safe radiation permissible in the lungs is that corresponding to 0.1 roentgen per day over the whole body.

All ordinary safety precautions can be taken to remove this inhalation danger, and several means can be used dependent on locale of the plant. Among these are (1) to use an odorant such as, for example, ammonia in the helium gas in order to indicate small helium leaks, (2) the use of a powerful fan to blow any escaping helium away from valve packing and other equipment on which work is being done, (3) the use of oxygen masks to prevent breathing escaping helium in locations where the use of a fan is impractical, (4) careful check, under competent supervision, of the radiation to which men are exposed, and relieving any men who have received more than a safe dose of radiation in any one day, (5) periodic medical examination of all personnel.

While the invention has been described with particular reference to a graphite type of moderator, it is to be understood that it is not limited to this moderator and that other neutron slowing materials which do not have an excessive neutron absorbing property may be utilized. For example, heavy water ($D_2O$) or beryllium may be used very effectively for this purpose. Further, fissionable material other than natural uranium may be used.

While the theory of nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

I claim:

In a device for effecting a self-sustaining neutron chain reaction, a mass of graphite having vertical passages therethrough, a plurality of graphite cartridges removably disposed in the passages and arranged one on top of another, the cross-sectional dimensions of the cartridges being slightly less than the diameter of the passages so that the cartridges substantially fill the passages, a heat extraction passage disposed longitudinally through each column of cartridges, uranium bodies disposed in the cooling passages in the cartridges, a removable support under each column of cartridges, and means responsive to a predetermined rise of power output of the device for moving at least one of the supports out of supporting relationship with the cartridges so that the cartridges supported by said support together with their uranium bodies fall by gravity from their proper positions in the graphite mass thereby reducing the reproduction ratio of the device.

References Cited in the file of this patent

UNITED STATES PATENTS

| | | |
|---|---|---|
| 1,313,527 | Doble | Aug. 19, 1919 |
| 1,674,458 | Troger | June 19, 1928 |
| 1,767,030 | Woodman | June 24, 1930 |
| 2,022,716 | Grine et al. | Dec. 3, 1935 |
| 2,127,193 | Toulmin | Aug. 16, 1938 |
| 2,206,634 | Fermi et al. | July 2, 1940 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |
| 233,278 | Switzerland | Oct. 16, 1944 |
| 648,293 | Great Britain | Jan. 3, 1951 |

OTHER REFERENCES

"A General Account of the Development of Methods of Using Atomic Energy for Military Purpose" by H. D. Smyth, August 1945, pages 22, 177.

Goodman: "The Science and Eng. of Nuclear Power," vol. 1, page 275, Addison-Wesley, Inc. (1947).

Kelly et al.: Phy. Rev. 73, 1135–9 (1948).

Polland and Davidson: "Applied Nuclear Physics," 2nd ed. pp. 256, 257, John Wiley & Sons, Inc., N. Y., 1951.